(12) United States Patent
Webber et al.

(10) Patent No.: US 7,922,199 B2
(45) Date of Patent: Apr. 12, 2011

(54) APPARATUS AND METHOD FOR CONTROLLING AN INFLATABLE CUSHION

(75) Inventors: James L. Webber, Shelby Township, MI (US); Ryan Pinsenschaum, Dayton, OH (US); Laura Hawthorn, Tipp City, OH (US)

(73) Assignee: Autoliv Development AB, Vargarda (SE)

( * ) Notice: Subject to any disclaimer, the term of this patent is extended or adjusted under 35 U.S.C. 154(b) by 301 days.

(21) Appl. No.: 12/062,139

(22) Filed: Apr. 3, 2008

(65) Prior Publication Data

US 2008/0246261 A1 Oct. 9, 2008

Related U.S. Application Data

(60) Provisional application No. 60/909,933, filed on Apr. 3, 2007.

(51) Int. Cl.
*B60R 21/16* (2006.01)
(52) U.S. Cl. .................................................. 280/743.2
(58) Field of Classification Search ................ 280/743.2
See application file for complete search history.

(56) References Cited

U.S. PATENT DOCUMENTS

| | | | |
|---|---|---|---|
| 5,246,250 A | 9/1993 | Wolanin et al. |
| 5,280,953 A | 1/1994 | Wolanin et al. |
| 5,405,166 A | 4/1995 | Rogerson |
| 5,462,305 A | 10/1995 | Hamada |
| 5,489,119 A | 2/1996 | Prescaro et al. |
| 5,746,447 A | 5/1998 | Dyer et al. |
| 5,762,367 A | 6/1998 | Wolanin |
| 5,788,267 A | 8/1998 | Lotspih et al. |
| 5,799,974 A | 9/1998 | Honda |
| 5,887,894 A | 3/1999 | Castagner et al. |
| 5,957,490 A | 9/1999 | Sinnhuber |
| 6,039,346 A | 3/2000 | Ryan et al. |
| 6,095,557 A | 8/2000 | Takimoto et al. |
| 6,116,644 A | 9/2000 | Viano et al. |
| 6,161,866 A | 12/2000 | Ryan et al. |
| 6,168,191 B1 | 1/2001 | Webber et al. |
| 6,170,871 B1 | 1/2001 | Goestenkors et al. |
| 6,176,511 B1 | 1/2001 | Adkisson et al. |
| 6,186,540 B1 | 2/2001 | Edgren |
| 6,203,061 B1 | 3/2001 | Niederman et al. |
| 6,213,502 B1 | 4/2001 | Ryan et al. |

(Continued)

FOREIGN PATENT DOCUMENTS

DE 3618060 A1 12/1987

(Continued)

*Primary Examiner* — Eric Culbreth
(74) *Attorney, Agent, or Firm* — Harness, Dickey & Pierce, P.L.C.

(57) ABSTRACT

A control device for modifying the deployment characteristics of an inflatable cushion of an airbag module, the control device comprising: a releasable retention device, a first end of the releasable retention device being releasably secured to an inner surface of the inflatable cushion at a first location, the releasable retention device being configured to limit deployment of the inflatable cushion in a first direction when the releasable retention device is secured to the first location of the inflatable cushion; and a sensing device for releasing the releasable retention device from the first location, the sensing device being fixedly secured to the inner surface of the inflatable cushion at a second location remote from the first location and releasably secured to the releasable retention device, the sensing device being configured to release the releasable retention device from the first location when the second location of the inflatable cushion travels a predetermined distance during inflation.

19 Claims, 11 Drawing Sheets

U.S. PATENT DOCUMENTS

| | | |
|---|---|---|
| 6,247,726 B1 | 6/2001 | Ryan |
| 6,250,677 B1 | 6/2001 | Fujimura |
| 6,286,859 B2 | 9/2001 | Derrick et al. |
| 6,308,983 B1 | 10/2001 | Sinnhuber |
| 6,315,323 B1 | 11/2001 | Pack, Jr. |
| 6,334,627 B1 | 1/2002 | Heym et al. |
| 6,371,517 B1 | 4/2002 | Webber et al. |
| 6,390,501 B1 | 5/2002 | Greib et al. |
| 6,409,209 B2 | 6/2002 | Amamori et al. |
| 6,409,213 B2 | 6/2002 | Webber et al. |
| 6,419,267 B1 | 7/2002 | Hashimoto et al. |
| 6,422,597 B1 | 7/2002 | Pinsenschaum et al. |
| 6,425,603 B1 | 7/2002 | Eschbach |
| 6,431,583 B1 | 8/2002 | Schneider |
| 6,431,596 B1 | 8/2002 | Ryan et al. |
| 6,439,603 B2 | 8/2002 | Damman et al. |
| 6,454,300 B1 | 9/2002 | Dunkle et al. |
| 6,499,765 B2 | 12/2002 | Hawthorn et al. |
| 6,511,094 B2 | 1/2003 | Thomas et al. |
| 6,561,545 B2 | 5/2003 | Greib et al. |
| 6,592,146 B2 | 7/2003 | Pinsenschaum et al. |
| 6,616,184 B2 | 9/2003 | Fischer |
| 6,634,671 B2 | 10/2003 | Heigl et al. |
| 6,991,258 B2 | 1/2006 | Hawthorn et al. |
| 7,195,281 B2 * | 3/2007 | Williams et al. ............ 280/743.2 |
| 7,621,561 B2 * | 11/2009 | Thomas et al. ............ 280/743.2 |
| 2002/0158456 A1 | 10/2002 | Fischer |
| 2004/0012179 A1 | 1/2004 | Pinsenschaum et al. |
| 2004/0012180 A1 | 1/2004 | Hawthorn et al. |
| 2004/0051285 A1 | 3/2004 | Fischer |
| 2004/0094941 A1 | 5/2004 | Waid et al. |
| 2004/0232677 A1 | 11/2004 | Fischer et al. |

FOREIGN PATENT DOCUMENTS

| | | |
|---|---|---|
| DE | 19912369 | 10/2000 |
| EP | 1112902 | 7/2001 |
| GB | 2338214 | 12/1999 |

* cited by examiner

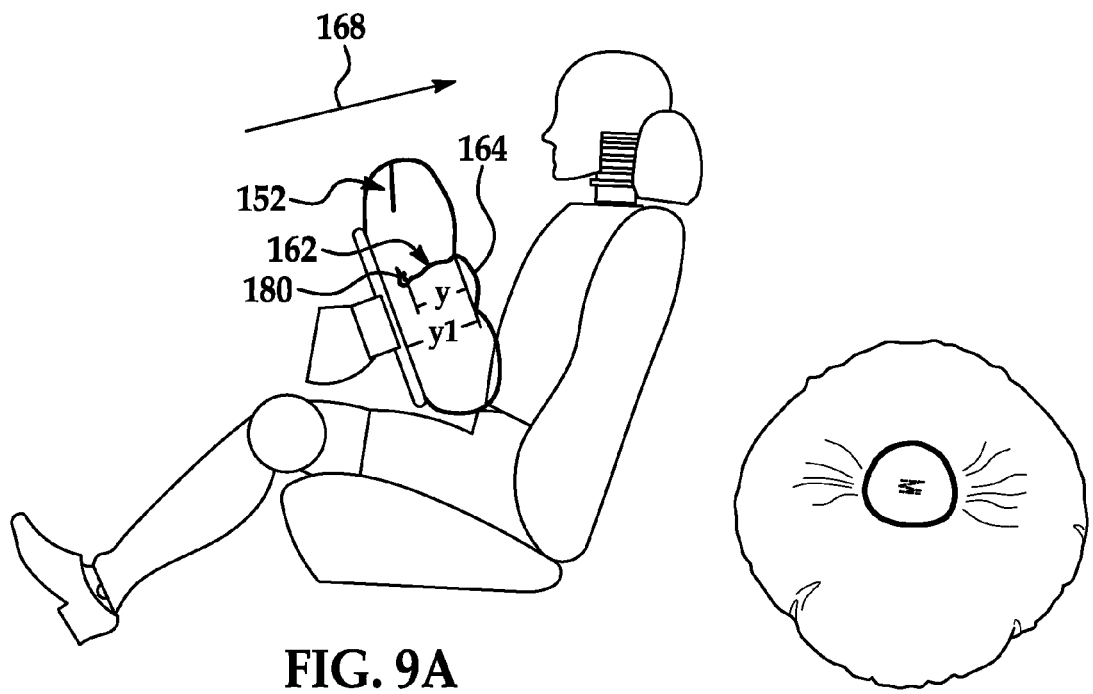
FIG. 9A
FIG. 9B
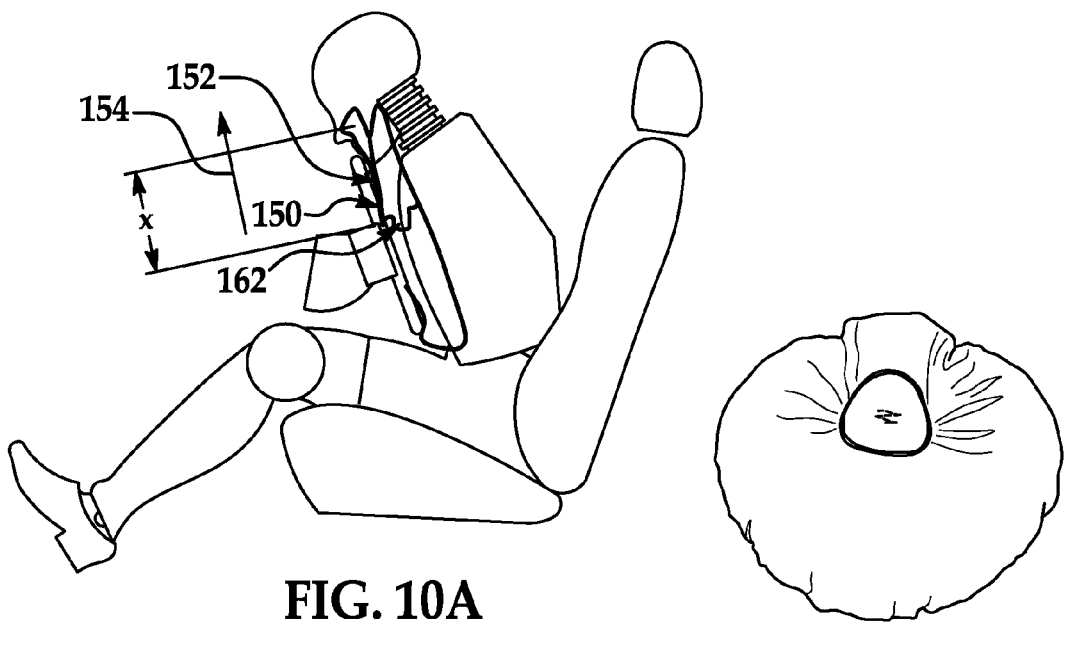
FIG. 10A
FIG. 10B

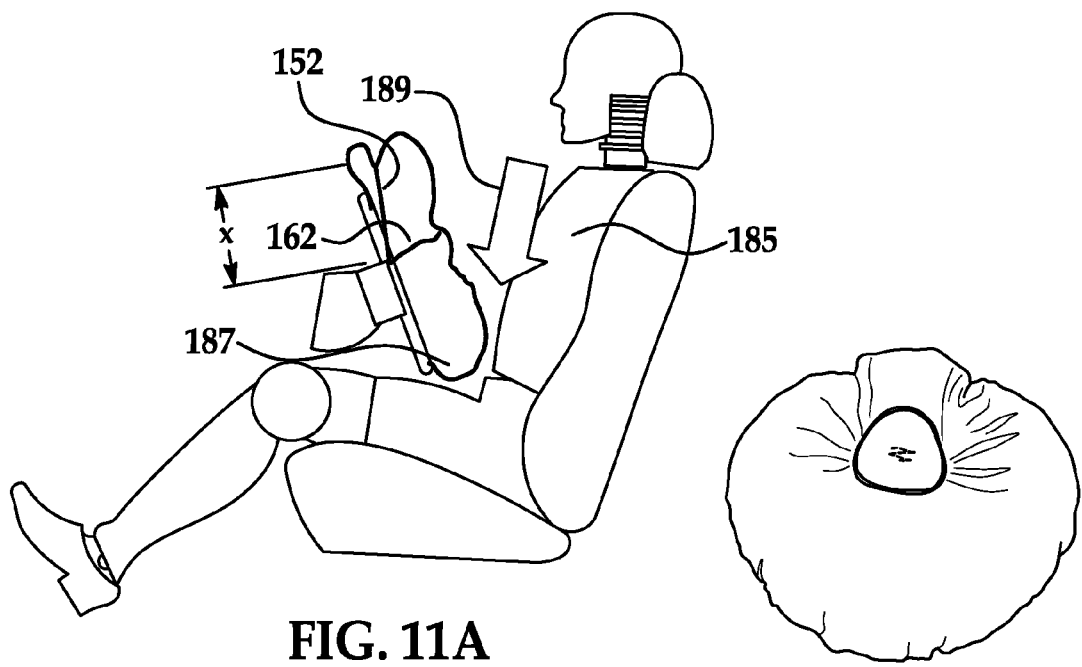
FIG. 11A
FIG. 11B
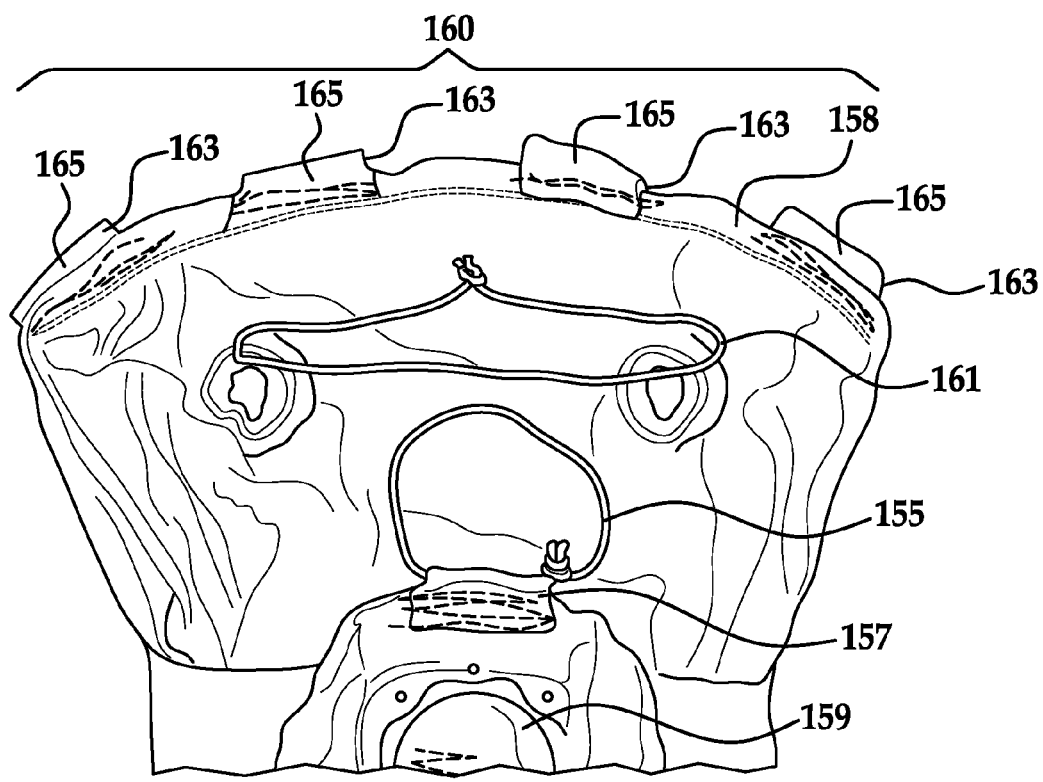
FIG. 12

APPARATUS AND METHOD FOR CONTROLLING AN INFLATABLE CUSHION

CROSS REFERENCE TO RELATED APPLICATIONS

This application claims the benefit of U.S. Provisional Patent Application Ser. No. 60/909,933 filed Apr. 3, 2007, the contents of which are incorporated herein by reference thereto.

BACKGROUND

This present invention relates generally to airbags or inflatable cushions for vehicles. More specifically, the present invention relates to systems and methods for controlling the deployment of an inflatable cushion of an airbag module.

Airbag modules have become common in modern automobiles. An airbag module typically comprises an inflatable cushion and an inflator within a housing. The module is installed in a desired position within the vehicle, such as the steering wheel, the dashboard, the seat, vehicle doors, the A-pillar, and other locations. The inflatable cushion is stored in a folded position within the housing in fluid communication with the inflator. In response to an activation event or occurrence, a sensor provides a signal for activating the inflator. The inflator provides a supply of inflating gas to the cushion to inflate the cushion, deploying it from the housing into the vehicle.

Various methods have been employed to tie the inflation level of the inflatable cushion to specific conditions. Accordingly, it is desirable to provide an inflatable cushion and/or apparatus or system for controlling the deployment of the inflatable cushion in response to conditions proximate to the deploying inflatable cushion.

SUMMARY

Disclosed herein is a device and method for manipulating the deployment characteristics of an inflatable cushion of an airbag module.

In one exemplary embodiment, a control device for modifying the deployment characteristics of an inflatable cushion of an airbag module is provided, the control device comprising: a releasable retention device, a first end of the releasable retention device being releasably secured to an inner surface of the inflatable cushion at a first location, the releasable retention device being configured to limit deployment of the inflatable cushion in a first direction when the releasable retention device is secured to the first location of the inflatable cushion; and a sensing device for releasing the releasable retention device from the first location, the sensing device being fixedly secured to the inner surface of the inflatable cushion at a second location remote from the first location and releasably secured to the releasable retention device, the sensing device being configured to release the releasable retention device from the first location when the second location of the inflatable cushion travels a predetermined distance during inflation.

In another exemplary embodiment, an airbag module is provided the airbag module comprising: a housing; an inflatable cushion being configured for deployment from the housing; an inflator for inflating the inflatable cushion, the inflator being in fluid communication with the inflatable cushion; a releasable retention device, a first end of the releasable retention device being releasably secured to an inner surface of the inflatable cushion at a first location, the releasable retention device being configured to limit deployment of the inflatable cushion in a first direction when the releasable retention device is secured to the first location of the inflatable cushion; and a sensing device for releasing the releasable retention device from the first location, the sensing device being fixedly secured to the inner surface of the inflatable cushion at a second location remote from the first location and releasably secured to the releasable retention device, the sensing device being configured to release the releasable retention device from the first location when the second location of the inflatable cushion travels a predetermined distance during inflation.

In another exemplary embodiment, a method for limiting deployment of an inflatable cushion in a first direction, the method comprising: securing a releasable retention device to an inner surface of the inflatable cushion at a first location, the releasable retention device being configured to limit deployment of the inflatable cushion in a first direction when the releasable retention device is secured to the first location of the inflatable cushion, the releasable retention device being secured to the first location by an engagement member of a sensing device; and releasing the releasable retention device from the first location when a portion of the sensing device fixedly secured to the inner surface of the inflatable cushion at a second location remote from the first location travels a predetermined distance during inflation and the engagement member is removed from the releasable retention device.

The above-described and other features of the present application will be appreciated and understood by those skilled in the art from the following detailed description, drawings, and appended claims.

DRAWINGS

FIGS. 9A-16 illustrate an alternative exemplary embodiment of the present invention.

DESCRIPTION OF EXEMPLARY EMBODIMENTS

Disclosed herein is a method and apparatus for selectively controlling the deployment or inflation of an inflatable cushion of an airbag module through the use of a control device that operates to control the deployment characteristics of an inflatable cushion. In accordance with an exemplary embodiment, the control device restrains deployment of the inflatable cushion in a first direction unless unobstructed deployment is detected in another or second direction.

In accordance with an exemplary embodiment of the present invention the control device comprises: a releasable retention device, wherein the releasable retention device is configured to limit deployment of the inflatable cushion in a first direction when the releasable retention device is secured to the inflatable cushion; and a sensing device for releasing the releasable retention device from the inflatable cushion when the inflatable cushion travels a predetermined distance in a second direction during inflation.

Figure 1:
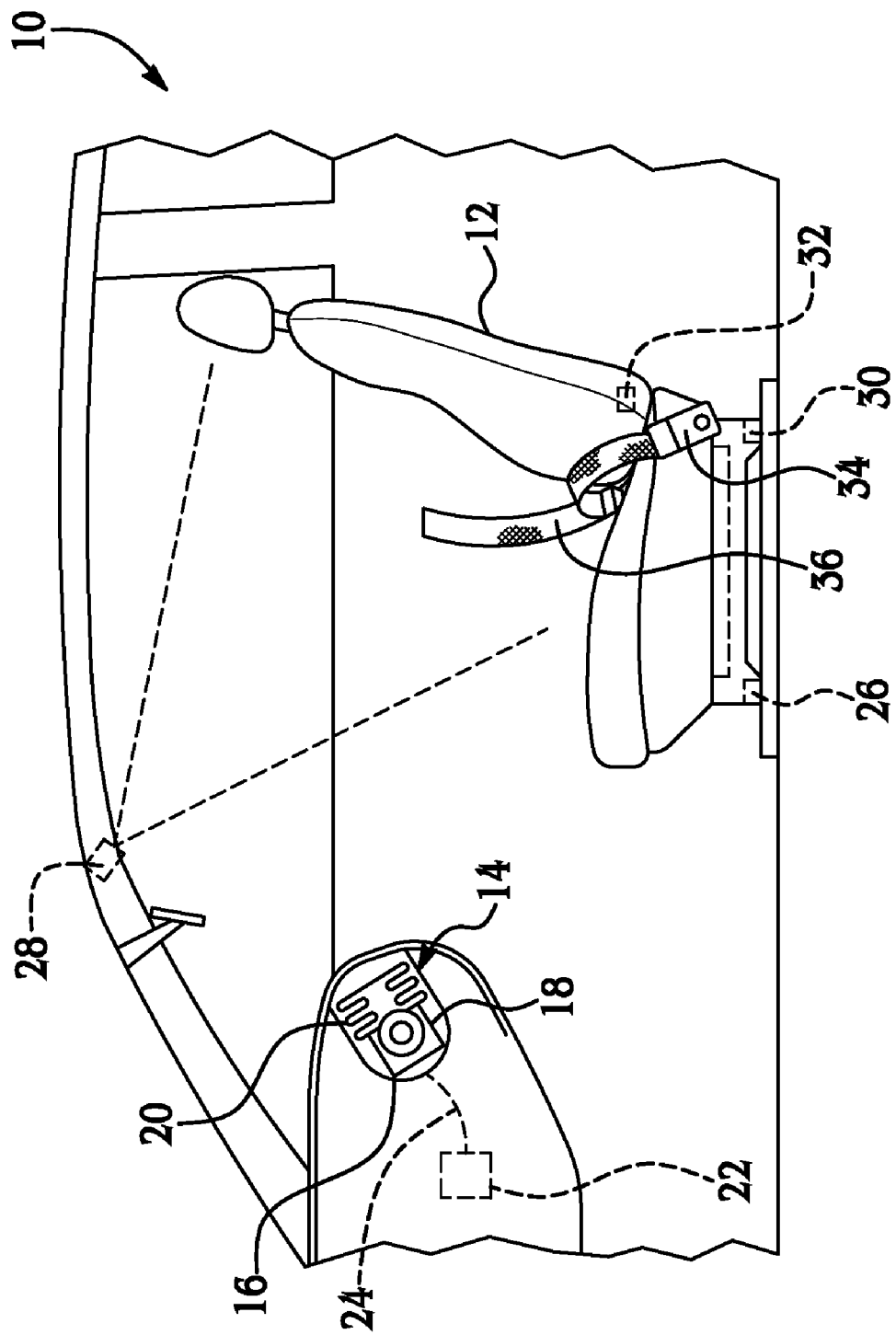
FIG. 1 is a partial view of a vehicle interior showing an inflatable cushion of a passenger side airbag module in a stored or un-deployed state.

Referring now to the Figures and in particular to FIG. 1 a portion of an interior of a vehicle 10 is illustrated. Included in the interior compartment of vehicle 10 is a seating structure 12 and an air bag module 14 disposed in a selected spatial relationship with respect to seating structure 12. The air bag module 14 comprises a housing 16, an inflator 18, and an inflatable air bag or cushion 20. The module 14 is positioned in the vehicle 10 for deployment of the cushion 20 towards the seating structure 12.

A sensor or sensing-and-diagnostic module 22 is adapted to detect an activation event wherein the occurrence of a threshold event will cause an activation signal 24 to be generated and received by the inflator 18, thereby causing the inflator to inflate the inflatable cushion. The detection of the threshold event is determined by one or more sensors that are disposed about the vehicle in accordance with known technologies. Thus, the activation signal 24 controls the activation of the airbag module 14. In an exemplary embodiment sensing-and-diagnostic module 22 comprises a microprocessor, microcontroller or other equivalent processing device capable of executing commands of computer readable data or program for executing a control algorithm that controls the operation of the airbag module. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

The inflatable cushion is stored in a folded or undeployed position in housing 16. The cushion is positioned to be in fluid communication with the inflator 18 wherein generation of the inflating gas will cause the cushion to inflate. Upon detection of an activation event by the sensing-and-diagnostic module 22, the inflator 18 is activated via signal 24 to generate the inflation gas. The inflation gas causes the cushion 20 to inflate and expand from housing 16 into the interior of the vehicle. It should be recognized that module 14 is illustrated by way of example only as being included in the dashboard of the vehicle. Of course, it is contemplated that module 14 can be installed for deployment in other regions of the vehicle, such as, but not limited to the steering wheel, the seat, the A-pillar, the roof, and other locations as well as other angular or positional relationships illustrated in FIG. 1. Moreover, the specific configurations of the vehicle interior, instrument panel, airbag module and relationship with regard to the same are provided as an example and it is, of course, understood that these configurations may vary from the specific configurations illustrated in FIG. 1.

Additionally, the present disclosure is also contemplated for use with various types of inflatable cushions and inflators. For example, cushions which are constructed and/or folded in a particular manner to achieve various deployment configurations and various types of inflators (e.g., dual stage inflators).

In addition, and in accordance with the alternative exemplary embodiments of the present invention, the sensing-and-diagnostic module can also be adapted to detect one or more conditions of the seating structure. For example, sensing-and-diagnostic module 22 can be adapted to detect one or more of the following: a load or amount of load (e.g., occupant weight) on the seating structure 12, a position of the seating structure, an angle of a portion of the seating structure with respect to another portion, the distance the seating structure is from the air bag module 14, and other data that is relevant to the deployment of the airbag by receiving input from a plurality of sensors disposed about the vehicle.

For example, the sensing-and-diagnostic module can receive inputs from one or more sensors such as, but not limited to, a seat position sensor 26, an optical scanner 28, a load sensor 30, a seat recline sensor 32, a seat belt use detection sensor (not shown), and a belt tensioning sensor 34. The sensors are positioned to provide input signals to module 22 indicative of one or more seat conditions. The one or more seat conditions combined with an occupant's size (e.g., weight determined by sensors) is inputted in a control algorithm resident upon a microprocessor disposed within the sensing and diagnostic module in order to determine a desired deployment scheme for the inflatable cushion. For example, the data inputs when compared to a look up table stored in the memory of the microprocessor or other readable format will allow the algorithm to determine whether a full deployment or partial deployment of the airbag is desired (e.g., tailoring of the airbag module by activating or not activating a system designed to modify the cushion deployment characteristics).

The continuous sampling of the various sensors allows the sensing and diagnostic module to be provided with various inputs before an activation event (deployment) occurs. It is noted that the airbag inflation system of the present disclosure is contemplated for use with any combination of the aforementioned sensors and it is not intended to be limited by the specific types of sensors discussed above.

In accordance with an exemplary embodiment of the present invention and referring now to FIGS. 2-8, deployment of the inflation cushion in a first direction is controlled by a control device 50 for modifying the deployment characteristics of an inflatable cushion of an airbag module. In an exemplary embodiment, the control device is disposed within the inflatable cushion of the air bag module. In accordance with an exemplary embodiment of the present invention the control device comprises a releasable retention device 52, which is configured to limit the deployment of the inflatable cushion in a first direction, which is illustrated generally by arrow 54.

In accordance with an exemplary embodiment of the present invention, the releasable retention device retards or restricts a first portion or leading edge of the inflatable cushion that would, due to the kinematics of the inflatable cushion, be the first portion of the inflatable cushion to deploy away from the airbag module and towards an occupant of the vehicle. Accordingly and by retarding this portion of the inflatable cushion, other portions or a second portion of the cushion will now deploy faster or more quickly in other directions away from the airbag module. For example, in at least FIGS. 1-3, which illustrates an inflatable cushion of a passenger side airbag module, a lower edge deploys outward before a forward edge and then if the lower edge is not obstructed the forward edge is allowed to completely deploy. Also, in at least FIGS. 9A-11B, which illustrates an inflatable cushion of a driver's side airbag module, an upper edge is retarded and a forward edge deploys outwardly before the upper edge and then if the forward edge is not obstructed the upper edge is allowed to completely deploy. In addition, the restraint of the upper edge of the driver side inflatable cushion also causes the lower edge to travel out first thus, locating itself between the lower portion of the occupant (e.g., upper leg portion and waist portion) and the steering wheel.

In other words and due to the cushion kinematics, an unrestrained inflatable cushion will deploy away from the module with at least one portion or a first portion providing a leading edge that will contact an object or individual prior to other portions or a second portion of the inflatable cushion. Accordingly, the other portions will deploy outwardly and away from the airbag module after the first portion corresponding to the leading edge has deployed away from the module. Moreover and depending of the occupant's location with respect to the inflatable cushion, the leading edge may contact less desirable areas of the occupant than those typically contacted by the "other portions" of the inflatable cushion.

In contrast and in accordance with an exemplary embodiment of the present invention, the control device retards the first portion of the inflatable cushion thereby causing the second portion or other portions to deploy out first, wherein the other portions are used to determine whether an occupant is in close proximity to the inflatable cushion by using the other portion or second portion as a sensing device. Moreover, these other portions will deploy in directions that will cause them to contact areas of the occupant that are more tolerant to contact with the inflatable cushion.

In accordance with an exemplary embodiment of the present invention, the releasable retention device has a first end 56 releasably secured to an inner surface 58 of the inflatable cushion at a first location 60, which corresponds to a first portion of the inflatable cushion providing a leading edge of the inflatable cushion that would due to the kinematics of the inflatable cushion be the first portion of the inflatable cushion to deploy away from the airbag module and towards an occupant of the vehicle.

Figure 2:
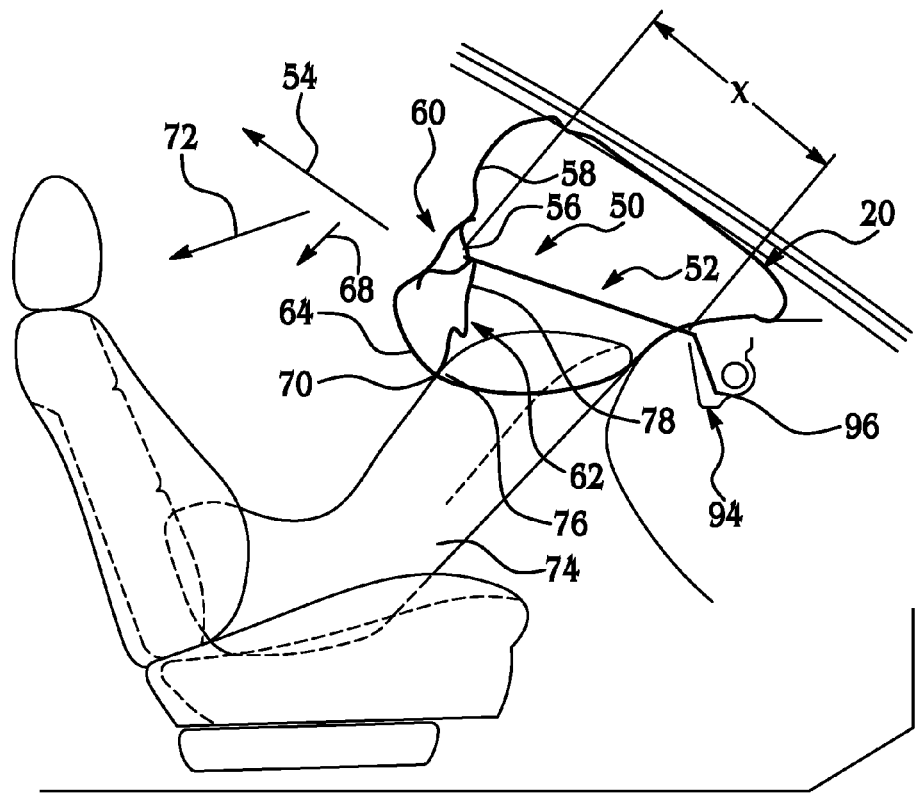
FIG. 2 is a partial view of a vehicle interior showing a cross-sectional view of an inflatable cushion deployed in an obstructed state with a control device constructed in accordance with one exemplary embodiment of the present invention.

In accordance with an exemplary embodiment of the present invention, the releasable retention device comprises a tether or other material suitable of withstanding the inflation forces applied to the inflatable cushion. In an exemplary embodiment, the releasable retention device or tether has an active length "x" or extended length "x" that corresponds to the deployment of the first location 60 of the inflatable cushion in the first direction 54 or from a point of securement to the first location and another point of securement, which in one exemplary embodiment is at the airbag module housing. In other words, the active length "x" will correspond to the deployment of the inflatable cushion in the first direction for example, and as illustrated in FIG. 2 a portion of the releasable retention device 52 bends around a portion of the instrument panel or airbag module housing.

Figure 3:
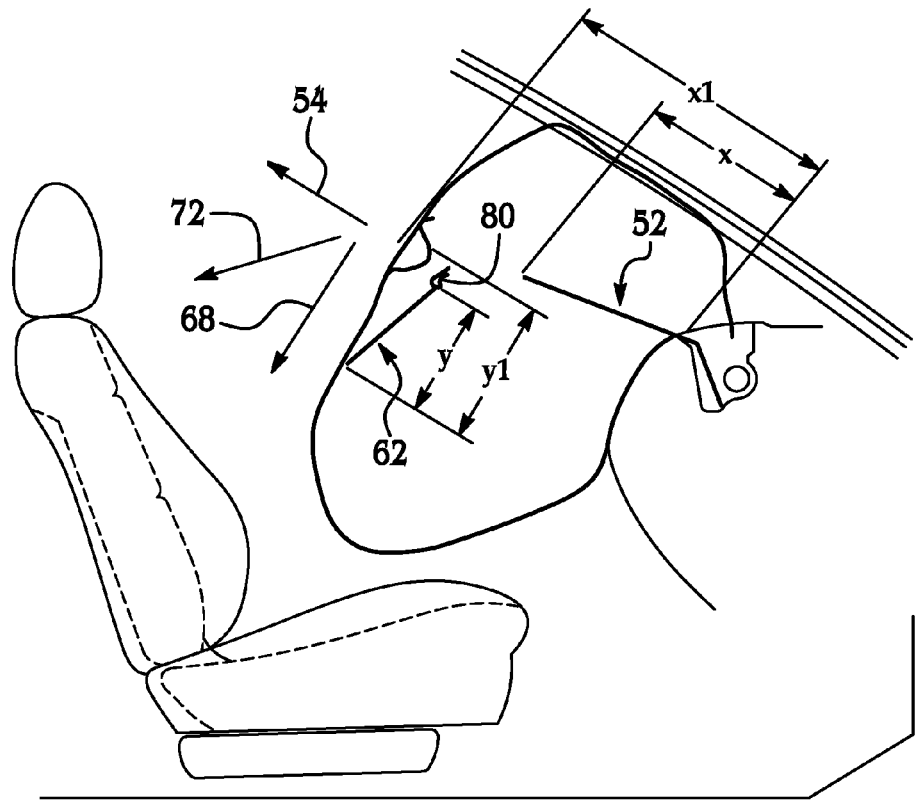
FIG. 3 is a partial view of a vehicle interior showing a cross-sectional view of an inflatable cushion deployed in an un-obstructed state with a control device constructed in accordance with one exemplary embodiment of the present invention.
Figure 4A:
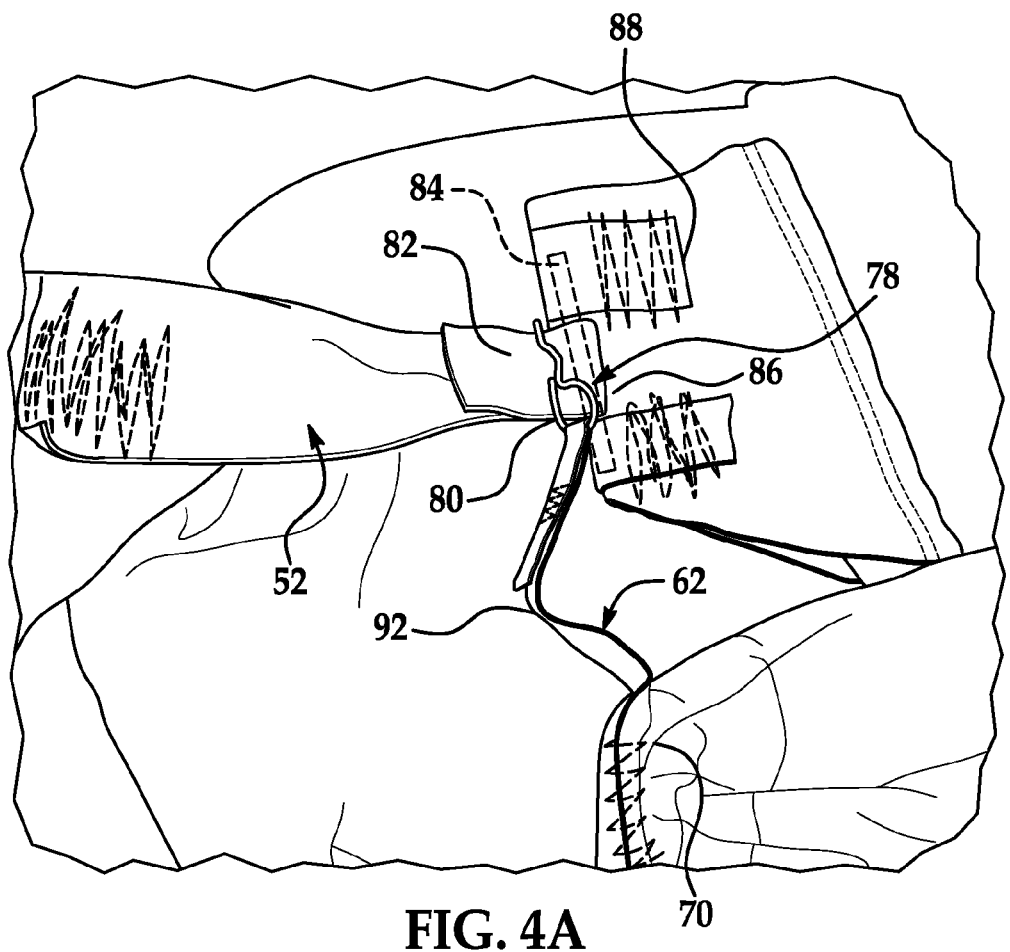
FIGS. 4A-4C are views illustrating the control device in accordance with one exemplary embodiment of the present invention.
Figure 4B:
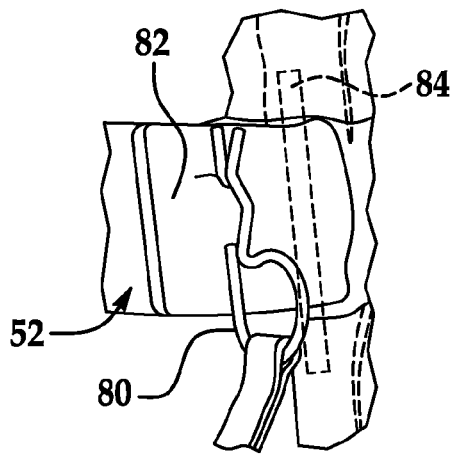
Figure 4C:
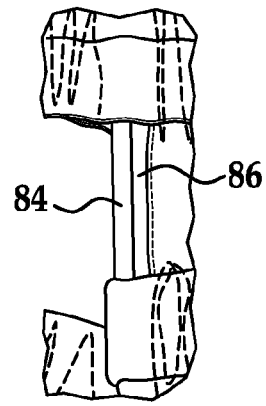

As shown in FIG. 3, the active length x of the releasable retention device is shorter than a distance "x1", which corresponds to a distance the inflatable cushion deploys in the first direction 54 during unobstructed deployment. Accordingly and in accordance with an exemplary embodiment of the present invention, the releasable retention device prevents the inflatable cushion from deploying completely in the first direction unless at least one other portion of the inflatable cushion has deployed in an unobstructed manner. Moreover, the restraint of the first portion of the inflatable cushion in the first direction causes a second portion or other portions to deploy out first or earlier in the deployment of the inflatable cushion then they would have had if the first portion of the inflatable cushion was not restrained. In addition, the other portions that are now deploying more quickly are used to determine whether an occupant is in close proximity to the inflatable cushion by using the other portion or second portion as a sensing member. In other words, the releasable retention device prevents the inflatable cushion from reaching distance x1 when the inflatable cushion is deployed and the releasable retention device is secured to the first location.

In accordance with an exemplary embodiment and in order to release the releasable retention device, the control device also comprises a sensing device 62. The sensing device is configured to detect whether a second portion 64 of the inflatable cushion deploys unobstructed in a second direction 68. This second direction corresponds to deployment of the second portion 64 in the second direction 68 which can also be described as from a point of releasable securement of the sensing device to the releasable retention device towards another point of securement of the sensing device to the second portion, which in one exemplary embodiment is an inner surface of the inflatable cushion proximate to the leading edge of second portion 64.

As described above, the restraint of the first portion by the releasable retention device causes the second portion to deploy faster than an unrestrained inflatable cushion. Thereafter, the second portion is used to determine whether deployment of the inflatable cushion is obstructed.

In accordance with an exemplary embodiment of the present invention, the second portion of the inflatable cushion is a lower forward edge 70 of the inflatable cushion and the second direction is a generally downward or forward and downward direction 72 from the first direction, which in accordance with exemplary embodiments of the present invention corresponds to more desirable contact locations.

In accordance with an exemplary embodiment the sensing device also comprises a tether that has an active length or extended length "y", which is shorter than a length "y1", which corresponds to the distance the inflatable cushion deploys in the second direction when the second portion of the inflatable cushion deploys unobstructed in the second direction. Accordingly, and in accordance with an exemplary embodiment of the present invention, and when the second portion of the inflatable cushion deploys at least a distance greater than "y" in the second direction the sensing device will become taught and then pull a pin or other equivalent device releasably securing the releasable retention device to the first location and release the releasable retention device from the first location of the inflatable cushion as well as the end of the sensing device having the pin secured thereto thereby allowing the inflatable cushion to deploy distance "x1" in the first direction.

In accordance with an exemplary embodiment of the present invention, the releasable retention device prevents the inflatable cushion from completely deploying in the first direction when a second portion of the inflatable cushion is obstructed during deployment, which in one non-limiting exemplary embodiment is when a rear facing child seat 74 is positioned in front of the deploying inflatable cushion (see FIG. 2). As shown, the rear facing child seat will obstruct the deployment of the inflatable cushion in the second direction and accordingly the releasable retention device will remain secured to the inflatable cushion thus limiting the deployment of the inflatable cushion in the first direction. In other words, the obstruction of the inflatable cushion in the second direction causes the sensing device to not fully reach its deployment length and thus, the releasable retention device remains secured to the inflatable cushion since the sensing device does not pull the pin securing the releasable retention device to the cushion.

Accordingly, exemplary embodiments of the present invention are directed to a control device disposed within an inflatable cushion, wherein the control device comprises a releasable retention device configured to limit the deployment of the inflatable cushion in at least a first direction, the releasable retention device being releasably secured to an inner surface of the inflatable cushion at a first location, and a sensing device for releasing the releasable retention device from the first location when a second location of the inflatable cushion travels a predetermined distance during inflation. The sensing device being fixedly secured to the inner surface of the inflatable cushion at the second location and the sensing device being configured to release the releasable retention device from the first location when second location has traveled the predetermined distance.

In accordance with an exemplary embodiment, the sensing device is secured to an inflatable cushion at a second location 76 and comprises a releasing member 78 for releasing the releasable retention device from the first location of the inflatable cushion when the second location of the inflatable cushion has deployed a predetermined distance in the second direction.

In accordance with one non-limiting exemplary embodiment and referring now to FIGS. 4A-6B the releasing member comprises a pin or retaining device 80 secured to one end of the sensing device for releasably securing an end 82 of the releasable retention device to itself after the end has traveled through a retention member 84, which is secured to the inner surface of the inflatable cushion and provides an opening 86, which allows the end to pass therethrough thereby securing the releasable retention device to the inner surface of the inflatable cushion. Non-limiting examples of pin or retaining device 80 include a cotter pin configuration wherein a portion of the cotter pin is passed through end 82 of the releasable retention device to secure the same to another portion of the releasable retention device after it has passed through and around the retention member. In accordance with an exemplary embodiment the pin or retaining device 80 is formed from a plastic material or metal material (e.g., steel) that is sufficient to withstand the tensile forces it will be exposed to as well as providing a low or desirable coefficient of friction with respect to the material of the releasable retention device.

In one non-limiting exemplary embodiment, retention member 84 is a pin or rod (FIG. 4C) secured at either end to a securement member 88 configured to distribute the restraint of releasable retention device 52 about a surface area of a forward portion or first portion or leading edge of the inflatable cushion. In one non-limiting exemplary embodiment, the securement member is a piece of material secured on at least two edges to the inner surface of the inflatable cushion and wherein the retention member is secured to a surface of the material between the two secured edges in order to disperse the retention load about the face of the inflatable cushion. In addition, the opening 86 will be located between the retention member and the surface of the material.

In addition and in accordance with an exemplary embodiment of the present invention, the securement of the releasable retention device to the first portion is configured so that a minimal amount of force is required from the sensing device to release the releasable retention device. This is facilitated by in at least one non-limiting embodiment by looping the releasable retention device about retention member 84 so that at least two portions of the releasable retention device are subjected to the tension retarding or restraining the first portion of the inflatable cushion. Accordingly, the amount of force required to dislodge the retaining device 80 from the releasable retention device is reduced as the tension is split among two legs or portions of the releasable retention device wrapped around retention member 84 thus reducing the tensional forces being applied to the retaining device 80 that is securing the two portions of the releasable retention device to the retention member.

Moreover and by requiring a minimal amount of force from the sensing device to release the releasable retention device (e.g., pull the pin out), the portions or the second portion that contact objects or occupants will also have a reduced contact force as compared to the first portion or leading edge that is now restrained. Ease of removal of a pin securing the sensing device to the releasable retention device will facilitate smooth deployment of the inflatable cushion. Again, this is facilitated by retarding or restraining the leading edge of the cushion, which due to the kinematics of the cushion is a portion of the cushion that is most likely to deploy outward from the instrument panel first and with a greater force than other portions of the cushion.

Accordingly, and if the second portion of the inflatable cushion is unobstructed, the sensing device will release the releasable retention device (e.g., pull the pin holding or securing the end of the releasable retention device to itself) from the forward portion of the cushion and full egress or deployment of the leading edge of the cushion will be allowed. Otherwise if the sensing device does not fully extend the pin will not be pulled and the releasable retention device remains secured to the leading edge of the inflatable cushion.

Figure 6A:
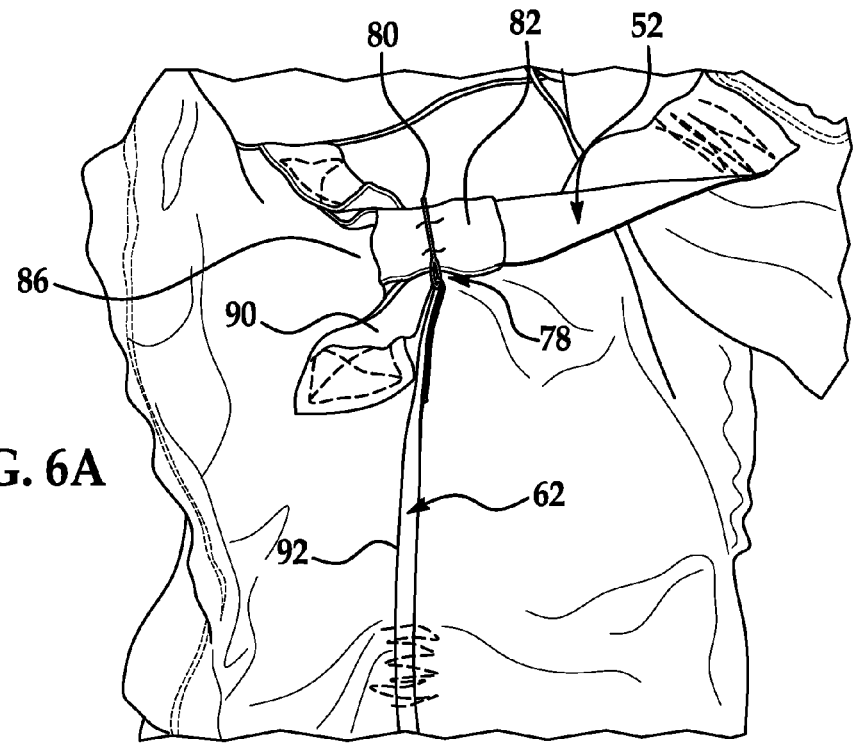
FIGS. 6A and 6B are views illustrating a control device in accordance with an alternative exemplary embodiment of the present invention.
Figure 6B:
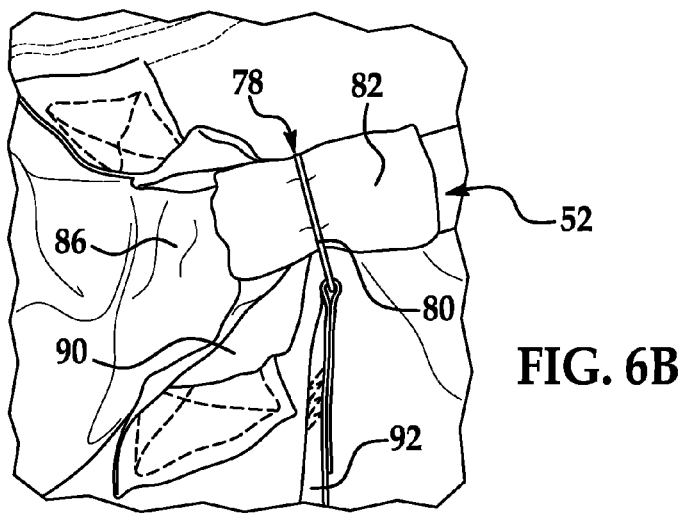

Referring now to FIGS. 6A-6B another alternative method for releasably securing the releasable retention device to the inflatable cushion is illustrated. Here, the securement member and the retention member are each replaced with a single piece of material 90 secured to the inner surface of the inflatable cushion at two locations. As in the previous embodiment, the end of the releasable retention device is secured about material 90 and the releasing member 78 secured to the sensing member secures end 82 to the releasable retention device after the same has passed through an opening defined by material 90, once again providing two portions of the releasable retention device to withstand the inflation forces of the inflatable cushion.

Referring back now to FIGS. 1-6B, the sensing device comprises a tether 92 secured to the releasing member 78 or pin 80 at one end and a portion of the inner surface of the inflatable cushion proximate to the second portion 64 at the other end. Accordingly and when the second portion travels unobstructed a distance greater than the length of the sensing device or tether 92 the tether becomes taught and pulls the pin from the end 82 of the releasable retention device and thus the first portion of the inflatable cushion is now allowed to expand or deploy in the direction of arrow 44 as end 82 unfurls or detaches from retention member 84 secured to the inflatable cushion.

In addition, and in one non-limiting exemplary embodiment and in order to secure a fixed end of the releasable retention device to a structure capable of withstanding the inflation forces when the inflatable cushion is deployed and the releasable retention device is not released from the inflatable cushion, a point of securement 94 is provided by securing (e.g., stitching or other equivalent securing means) a fixed end 96 of the releasable retention device to the inflatable cushion proximate to an anchor 98 secured to an exterior surface 100 of the inflatable cushion. In accordance with an exemplary embodiment the anchor 98 is configured to be received within a complimentary opening in either or both of the airbag module housing or a structural member of the instrument panel.

In yet another alternative, and referring now to FIGS. 5A-5E and in order to secure a fixed end of the releasable retention device to a structure capable of withstanding the inflation forces when the inflatable cushion is deployed and the releasable retention device is not released from the inflatable cushion the point of the securement 94 is provided by passing an end portion of the releasable retention device through the opening of the inflatable cushion wherein the end portion has anchor 98 secured thereto and the anchor 98 is configured to be received within a complimentary opening 102 in either or both of the airbag module housing or a structural member of the instrument panel.

Figure 5A:
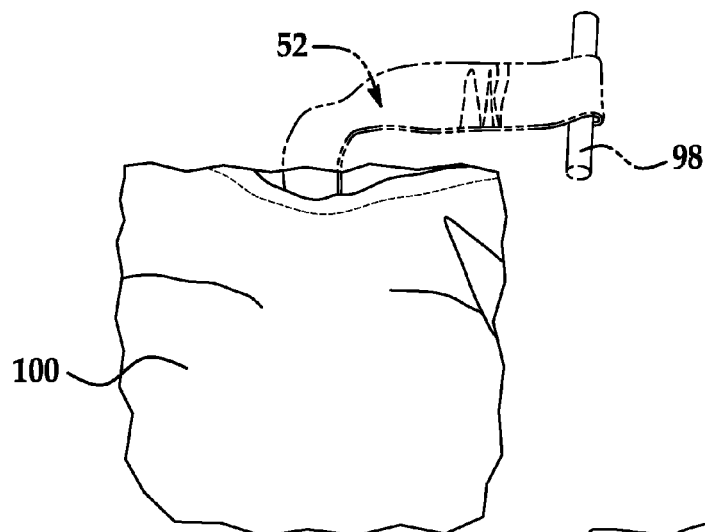
FIGS. 5A-5E are views of the releasable retention member of the control device in accordance with exemplary embodiments of the present invention.
Figure 5B:
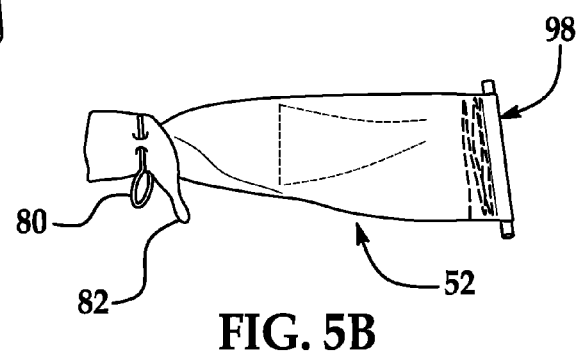
Figure 5C:
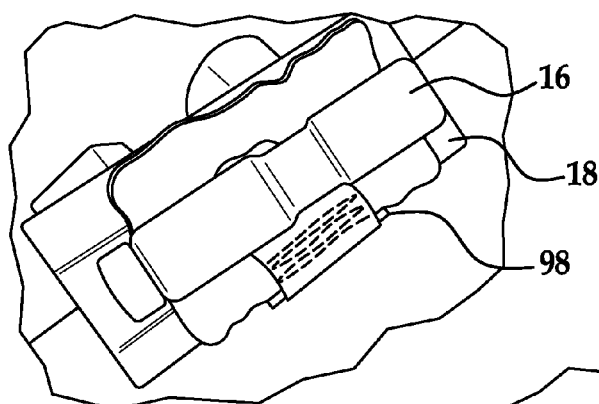
Figure 5D:
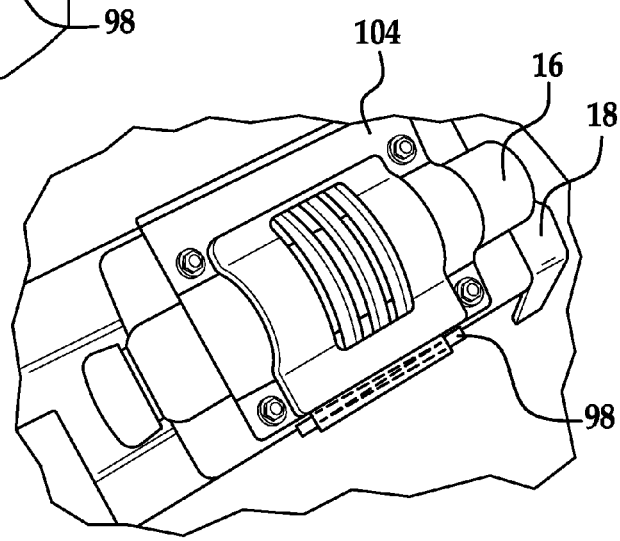
Figure 5E:
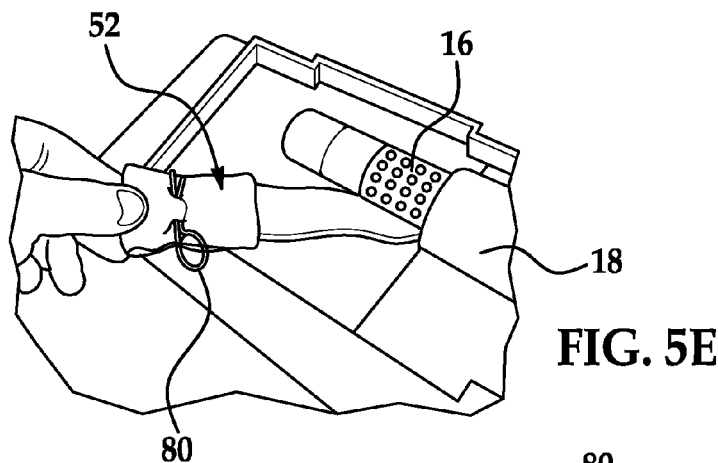

In yet another alternative, the anchor 98 is disposed between a portion of the inflator and a bracket 104 retaining the inflator in place (FIG. 5D). As shown in FIGS. 5A-5E, the releasable retention device has its fixed securement end passed through the inflation opening of the inflatable cushion and thereafter a portion of the releasable retention device is disposed between the inflator and the airbag module housing. In addition, the anchor is configured so that it cannot pass between the inflator and the airbag module housing during deployment of the inflatable cushion. Furthermore and as shown in FIG. 5D, the inflator is held in place by an attachment plate 104 which also prevents the anchor from passing therethrough. FIG. 5E shows the releasable retention device secured to the airbag module housing with the inflatable cushion removed for clarity purposes.

Of course the aforementioned embodiment are examples of methods for rigidly securing the releasable retention device to the inflatable cushion and exemplary embodiments of the present invention are not intended to be limited to the specific configurations illustrated herein.

Figure 7:
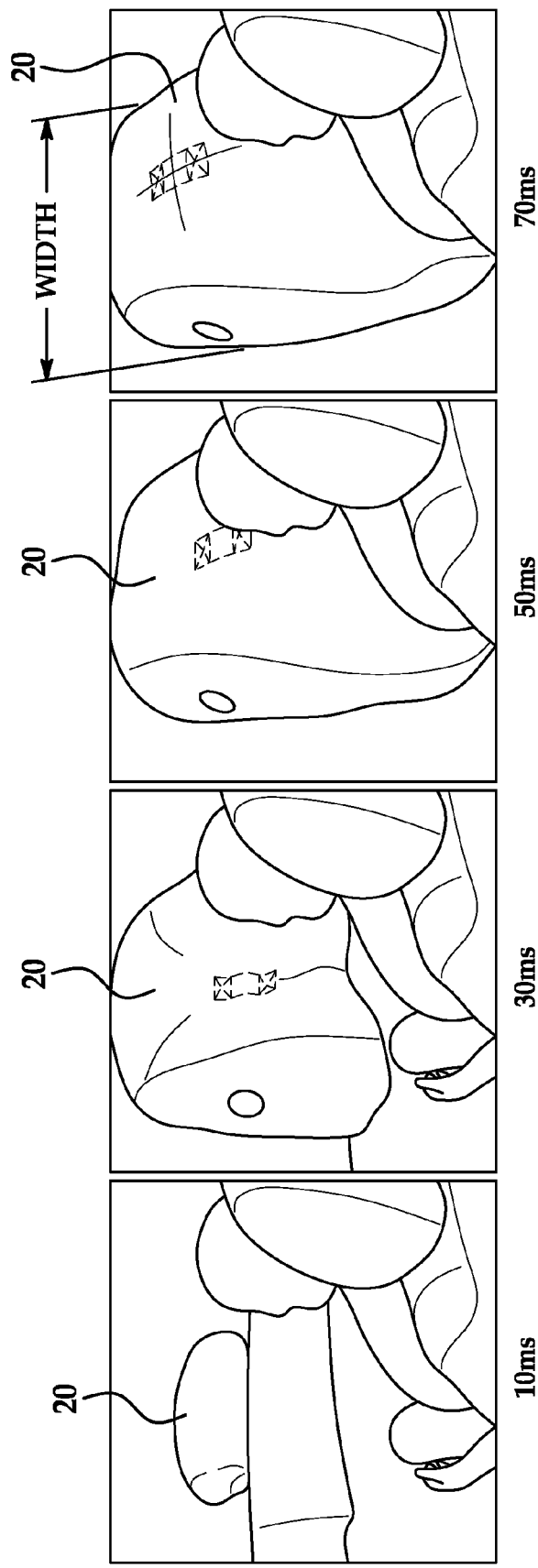
FIG. 7 illustrates sequential views of an unobstructed deployment of an inflatable cushion.
Figure 8:
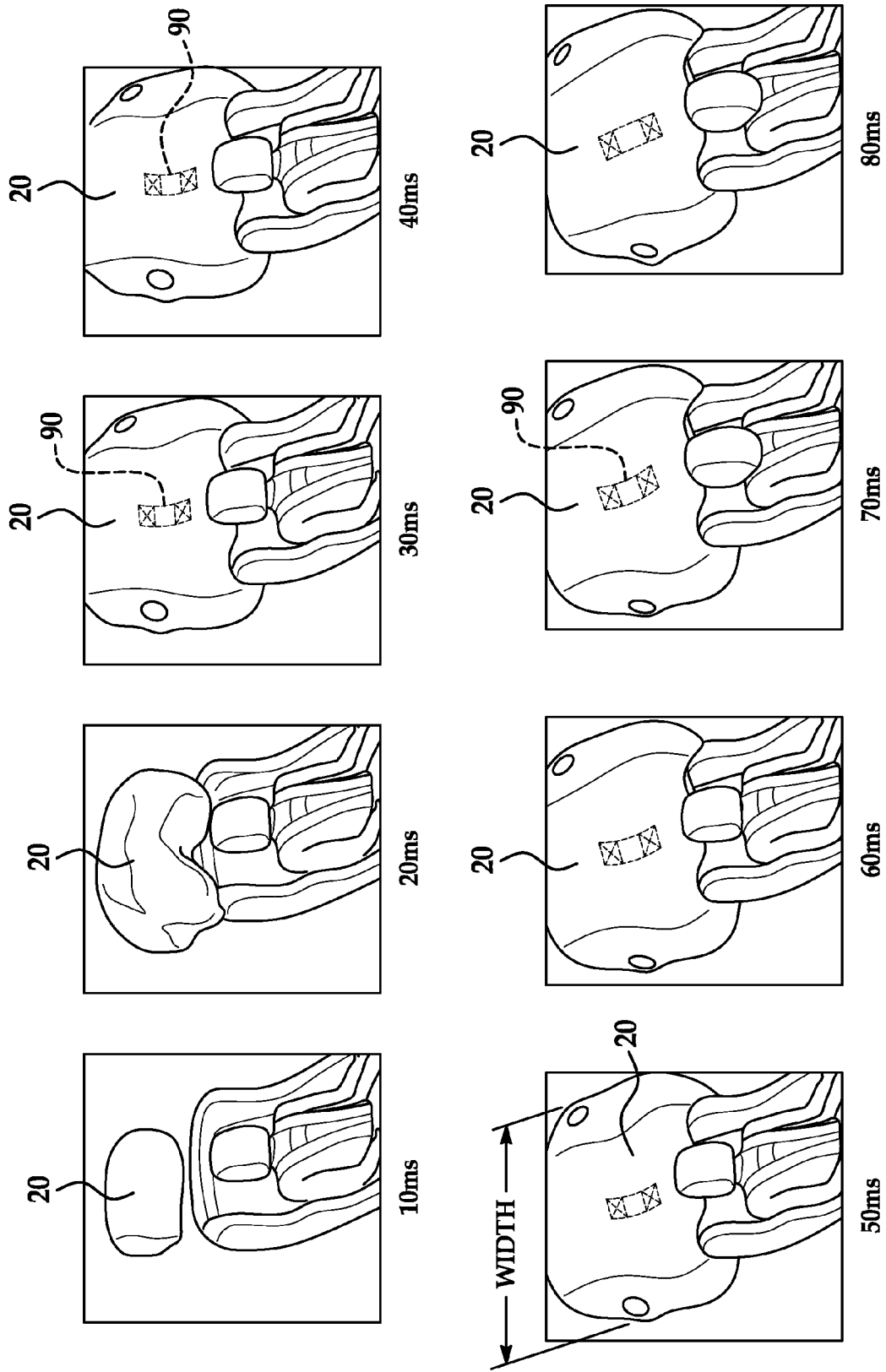
FIG. 8 illustrates sequential views of an obstructed deployment of the inflatable cushion.

Referring now to FIG. 7, sequential views of an unobstructed deployment of the inflatable cushion is illustrated while FIG. 8 illustrates sequential views of an obstructed deployment of the inflatable cushion. As clearly illustrated in FIG. 8 the inflatable cushion is restrained in the first direction by the releasable retention device since the second portion of the inflatable cushion was blocked or obstructed and the sensing device was not deployed to its full operational length. Moreover, and as illustrated in FIG. 8, the restrained inflatable cushion clearly has a larger deployed width than that of the inflatable cushion illustrated in FIG. 7.

Referring now to FIGS. 9A-16 an alternative exemplary embodiment of the present invention is illustrated. Here components performing similar or analogous functions are labeled in multiples of 100. Referring now to the Figures, an inflatable cushion 108 configured for use with a driver side airbag module is illustrated. As in the previous embodiment, the inflatable cushion in a first direction is controlled by a control device 150 that is disposed within the inflatable cushion.

Figure 13:
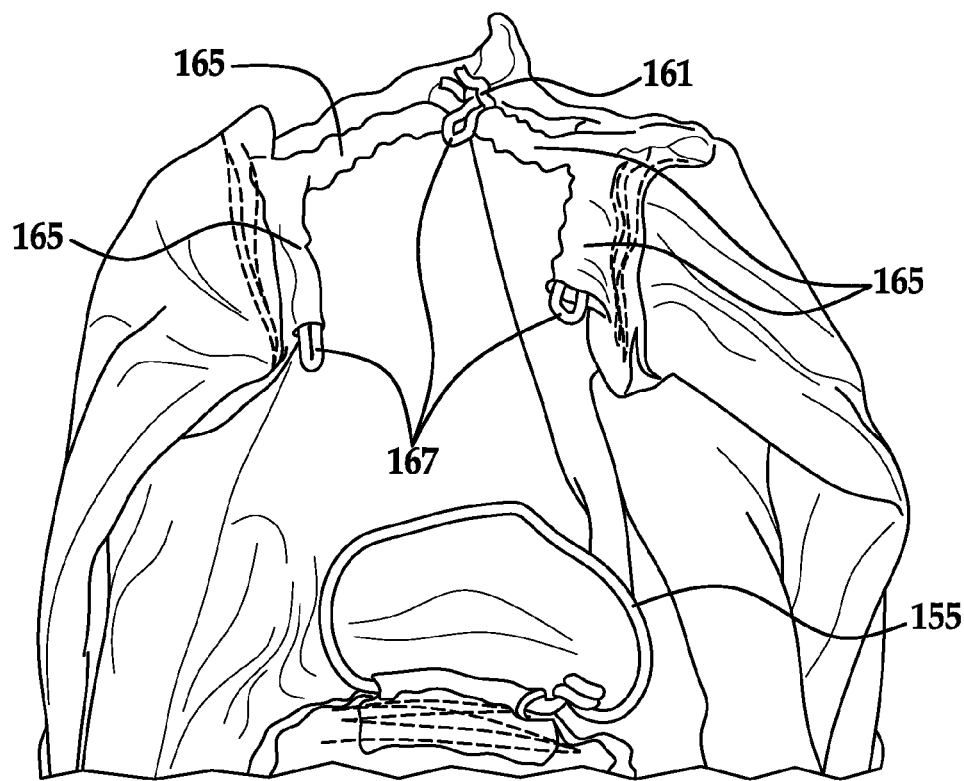

Here the control device comprises a releasable retention device 152, which is configured to limit the deployment of the inflatable cushion in a first direction, which is illustrated generally by arrow 154. In accordance with an exemplary embodiment, the releasable retention device has a first portion 155 secured at one end 157 proximate to an inflation opening 159 of the inflatable cushion and a second portion 161 releasably secured to an inner surface 158 of the inflatable cushion at a first location 160. In one non-limiting exemplary embodiment, the second portion comprises a loop of nylon woven material or other equivalent material that is passed through a plurality of openings 163 defined by a plurality of members 165 secured at least two portions to define openings 163. In accordance with an exemplary embodiment the second portion is passed through each of the openings 163 (see FIG. 13) wherein several portions 167 of the second portion are pulled together to provide one point of securement 169 between second portion 161 and first portion 155. As illustrated in FIG. 13 the end portions and a middle portion of second portion 161 are gathered to provide the point of securement, wherein the members 165 are also gathered together. In accordance with an exemplary embodiment of the present invention members 165 are located at a peripheral edge 171 of the inflatable cushion, which corresponds to an area where a front cushion portion 173 is secured to a rear cushion portion 175, which defines a peripheral edge of the inflatable cushion thus limiting or restraining the deployment of the inflatable cushion in the first direction when the first portion is secured to the second portion. Of course, members 165 may be located at other portions of the inflatable cushion.

Figure 14:
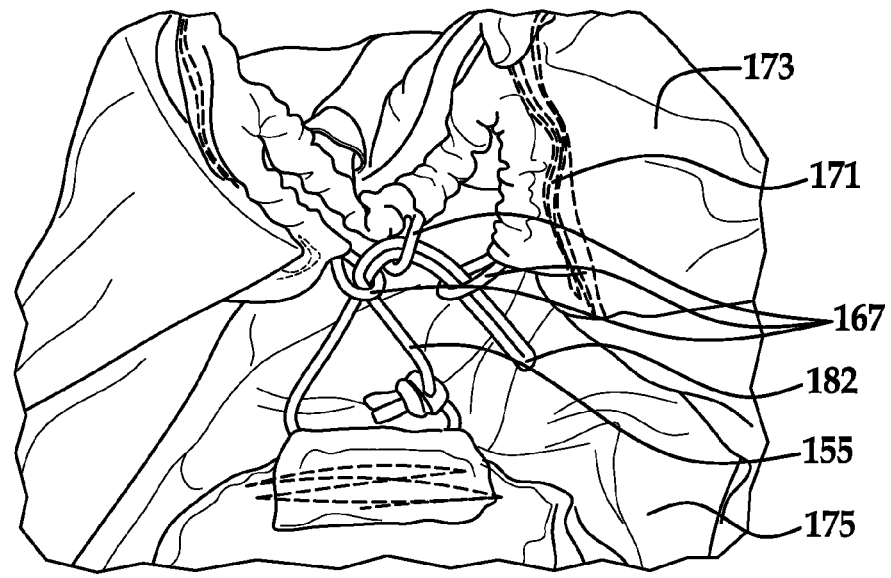

As illustrated in FIG. 14, the first portion is passed through loops defined by the second portion after the same has been passed through the openings in the members. Thereafter an end portion 182 of the first portion is secured to first portion after it has passed through the loops of the second portion.

In accordance with exemplary embodiments of the present invention, the first portion and the second portion of the releasable retention device comprises a tether or other material suitable of withstanding the inflation forces applied to the inflatable cushion.

Referring now to FIGS. 9-11B and in accordance with an exemplary embodiment, the combined length of the first portion and the second portion of the releasable retention device or tether has an active length "x" or extended length "x" that corresponds to the deployment of the first location 160 of the inflatable cushion in the first direction 154. In other words, the active length "x" will correspond to the deployment of the inflatable cushion in the first direction.

As shown, the active length x of the releasable retention device is shorter than a distance "x1", which corresponds to a distance the inflatable cushion deploys in the first direction 154 during unobstructed deployment. Accordingly and in accordance with an exemplary embodiment of the present invention, the releasable retention device prevents the inflatable cushion from deploying completely in the first direction unless at least one other portion of the inflatable cushion has deployed in an unobstructed manner. In other words, the releasable retention device prevents the inflatable cushion from reaching distance x1 when the inflatable cushion is deployed and the releasable retention device is secured to the first location.

In accordance with an exemplary embodiment and in order to release the releasable retention device, the control device also comprises a sensing device 162. The sensing device is configured to detect whether a second portion of 164 of the inflatable cushion deploys unobstructed in a second direction 168 that corresponds to the deployment of the second portion 164 of the inflatable cushion in the second direction 168 or from a point of releasable securement to the releasable retention device and another point of securement, which in one exemplary embodiment is an inner surface of the inflatable cushion proximate to the second portion 164. In accordance with an exemplary embodiment of the present invention, the second portion of the inflatable cushion is a forward or central face portion 170 of the inflatable cushion and the second direction is generally forward from the first direction.

In accordance with an exemplary embodiment of the present invention the sensing device has an active length or extended length "y", which is shorter than a length "y1", which corresponds to the distance the inflatable cushion deploys in the second direction when the second portion of the inflatable cushion deploys unobstructed in the second direction. Accordingly, and in accordance with an exemplary embodiment of the present invention, and when the second portion of the inflatable cushion deploys at least a distance greater than "y" in the second direction the sensing device will release the releasable retention device from the first location of the inflatable cushion thereby allowing the inflatable cushion to deploy distance "x1" in the first direction.

Also shown in FIG. 11A is that even when there is no restriction of the inflatable cushion in the first direction the restriction of the inflatable cushion in the second direction or early restriction of the inflatable cushion in the second direction causes a lower edge 187 to deploy in the direction of arrow 189 thereby placing a portion of the inflatable cushion between the occupant and the steering wheel. The same is also true during restricted deployment of the inflatable cushion of the passenger side air bag module. In other words, early restriction of the inflatable cushion in one direction causes deployment of the inflatable cushion in another direction that is not restricted by the inflatable cushion.

In accordance with an exemplary embodiment of the present invention, the releasable retention device prevents the inflatable cushion from completely deploying in the first direction when a second portion of the inflatable cushion is obstructed during deployment, which in one non-limiting exemplary embodiment is when an occupant 185 is positioned in a predetermined distance in front of the deploying inflatable cushion (see at least FIGS. 9A and 10A). As shown, the occupant will obstruct the deployment of the inflatable cushion in the second direction and accordingly the releasable retention device will remain secured to the inflatable cushion thus limiting the deployment of the inflatable cushion in the first direction. In other words, the obstruction of the inflatable cushion in the second direction causes the sensing device to not fully reach its deployment length and thus, the releasable retention device remains secured to the inflatable cushion.

In accordance with an exemplary embodiment, the sensing device is secured to inflatable cushion at a second location 176 and comprises a releasing member 178 for releasing the releasable retention device from the first location of the inflatable cushion when the second location of the inflatable cushion has deployed a predetermined distance in the second direction.

Figure 15:
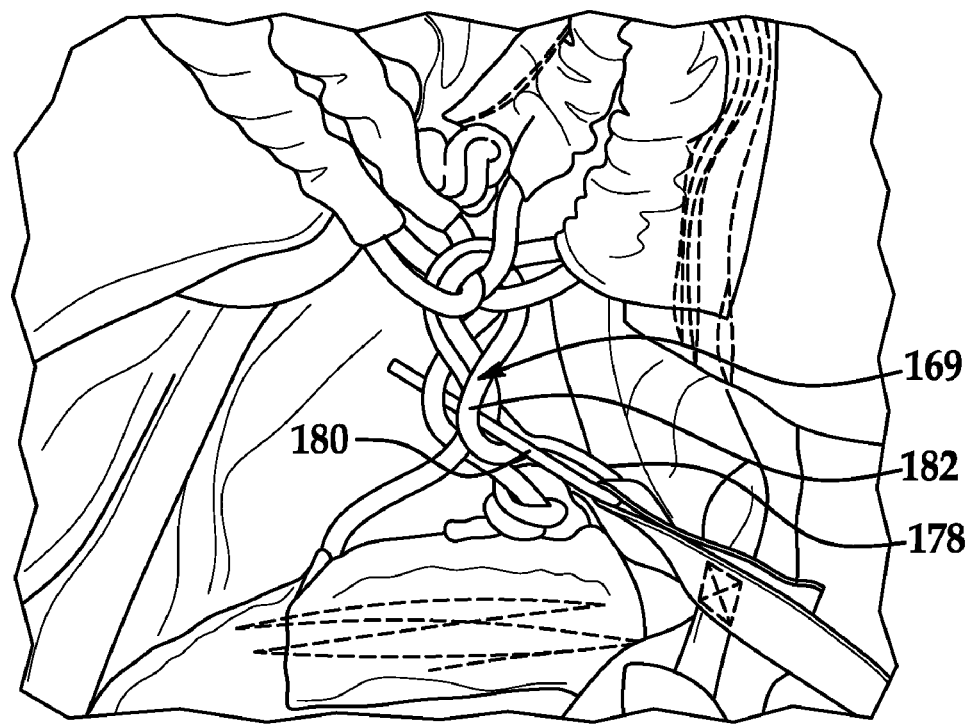
Figure 16:
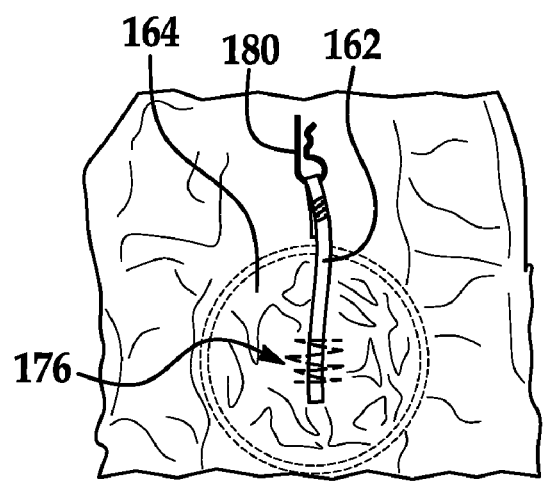

In accordance with one non-limiting exemplary embodiment and referring now to FIGS. 15 and 16 the releasing member comprises a pin or retaining device 180 for securing end 182 of the first portion of the releasable retention device to the second portion of the releasable retention device after the end has traveled through a plurality of loops of the second portion, which is releasably secured to the inner surface of the inflatable cushion. In one non-limiting exemplary embodiment each securement member 165 is a piece of material secured at least two areas to the inner surface of the inflatable cushion in order to disperse the retention load about the desired portion of the inflatable cushion.

Accordingly, and if the second portion of the inflatable cushion is unobstructed, the sensing device will release the releasable retention device (e.g., pull the pin holding or securing the end of the releasable retention device to itself) from the forward portion of the cushion and full egress or deployment of the leading edge of the cushion will be allowed. Otherwise if the sensing device does not fully extend the pin will not be pulled and the releasable retention device remains secured to the leading edge of the inflatable cushion.

Of course the aforementioned embodiments are examples of methods for releaseably securing the releasable retention device to the inflatable cushion and exemplary embodiments of the present invention are not intended to be limited to the specific configurations illustrated herein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control device for modifying the deployment characteristics of an inflatable cushion of an airbag module, the control device comprising:

a releasable retention device, a first end of the releasable retention device being releasably secured to an inner surface of the inflatable cushion at a first location, the releasable retention device being configured to limit deployment of the inflatable cushion in a first direction when the releasable retention device is secured to the first location of the inflatable cushion; and a sensing device for releasing the releasable retention device from the first location, the sensing device being fixedly secured to the inner surface of the inflatable cushion at a second location remote from the first location and releasably secured to the releasable retention device, the sensing device being configured to release the releasable retention device from the first location when the second location of the inflatable cushion travels a predetermined distance during inflation.

2. The control device as in claim 1, wherein the predetermined distance corresponds to deployment of a lower edge of the inflatable cushion in an unobstructed manner in a second direction.

3. The control device as in claim 1, wherein the first end of the releasable retention device is wrapped around a securement feature secured to the inner surface at the first location and the first end is secured to the releasable retention device by an engagement member secured to the sensing device and a force for removing the engagement member from the releasable retention device is less than a force applied to the releasable retention device when the releasable retention device is restraining the first location of the inflatable cushion.

4. The control device as in claim 3, wherein the releasable retention device is a tether and the sensing device is a tether.

5. The control device as in claim 3, wherein the securement feature comprises: a member secured to the inner surface at the first location; a pin secured to the member at either end to define a slot through which the first end of the releasable retention device passes.

6. The control device as in claim 5, wherein the member is a planar member secured to the inner surface at the first location at least two edges in order to disperse a restraining force provided by the releasable retention device at the first location when the inflatable cushion is deployed and the releasable retention device is secured to the securement feature.

7. The control device as in claim 6, wherein the engagement member is a pin securing the first end of the releasable retention device to the releasable retention device by passing through portions of the releasable retention device and the first end of the releasable retention device and the pin is capable of being removed from the releasable retention device when the second location of the inflatable cushion travels the predetermined distance during inflation of the inflatable cushion.

8. The control device as in claim 1, wherein the inflatable cushion is configured for use in a driver side airbag module and the predetermined distance corresponds to deployment of an upper edge of the inflatable cushion in an unobstructed manner in a second direction.

9. The control device as in claim 8, wherein the releasable retention device comprises a first portion and a second portion and the first portion is secured to proximate to an inflation opening of the inflatable cushion and the second portion is releasably secured to the inner surface of the inflatable cushion and the first portion.

10. The control device as in claim 9, wherein the first portion and the second portion each comprise a loop of material.

11. The control device as in claim 9, wherein the second portion passes through a plurality of loops of material secured to the inner surface of the inflatable cushion at the first location and second portion is releasably secured to the first portion by an engagement member secured to the sensing device.

12. The control device as in claim 11, wherein the engagement member is a pin securing the first portion of the releasable retention device to the second portion of the releasable retention device by passing through portions of the first and second portions of the releasable retention device and the pin is capable of being removed from the first and second portions of the releasable retention device when the second location of the inflatable cushion travels the predetermined distance during inflation of the inflatable cushion.

13. An air bag module, comprising:
a housing;
an inflatable cushion being configured for deployment from the housing;
an inflator for inflating the inflatable cushion, the inflator being in fluid communication with the inflatable cushion;
a releasable retention device, a first end of the releasable retention device being releasably secured to an inner surface of the inflatable cushion at a first location, the releasable retention device being configured to limit deployment of the inflatable cushion in a first direction when the releasable retention device is secured to the first location of the inflatable cushion; and
a sensing device for releasing the releasable retention device from the first location, the sensing device being fixedly secured to the inner surface of the inflatable cushion at a second location remote from the first location and releasably secured to the releasable retention device, the sensing device being configured to release the releasable retention device from the first location when the second location of the inflatable cushion travels a predetermined distance during inflation.

14. The airbag module as in claim 13, wherein the predetermined distance corresponds to deployment of a lower edge of the inflatable cushion in an unobstructed manner in a second direction.

15. The airbag module as in claim 13, wherein the first end of the releasable retention device is wrapped around a securement feature secured to the inner surface at the first location and the first end is secured to the releasable retention device by an engagement member secured to the sensing device.

16. The airbag module as in claim 15, wherein the releasable retention device is a tether and the sensing device is a tether and the securement feature comprises: a member secured to the inner surface at the first location; a pin secured to the member at either end to define a slot through which the first end of the releasable retention device passes and the engagement member is a plastic pin securing the first end of the releasable retention device to the releasable retention device by passing through portions of the releasable retention device and the first end of the releasable retention device and the plastic pin is capable of being removed from the releasable retention device when the second location of the inflatable cushion travels the predetermined distance during inflation of the inflatable cushion.

17. The airbag module as in claim 13, wherein the inflatable cushion is configured for use in a driver side airbag module and the predetermined distance corresponds to deployment of an upper edge of the inflatable cushion in an unobstructed manner in a second direction.

18. The airbag module as in claim 17, wherein the releasable retention device comprises a first portion and a second portion and the first portion is secured to proximate to an inflation opening of the inflatable cushion and the second portion is releasably secured to the inner surface of the inflatable cushion and the first portion and the first portion and the second portion each comprise a loop of material and the second portion passes through a plurality of loops of material secured to the inner surface of the inflatable cushion at the first location and second portion is releasably secured to the first portion by an engagement member secured to the sensing device.

19. A method for limiting deployment of inflatable cushion in a first direction, comprising:
securing a releasable retention device to an inner surface of the inflatable cushion at a first location, the releasable retention device being configured to limit deployment of the inflatable cushion in a first direction when the releasable retention device is secured to the first location of the inflatable cushion, the releasable retention device being secured to the first location by an engagement member of a sensing device; and
releasing the releasable retention device from the first location when a portion of the sensing device fixedly secured to the inner surface of the inflatable cushion at a second location remote from the first location travels a predetermined distance during inflation and the engagement member is removed from the releasable retention device.

* * * * *